Figure 1:
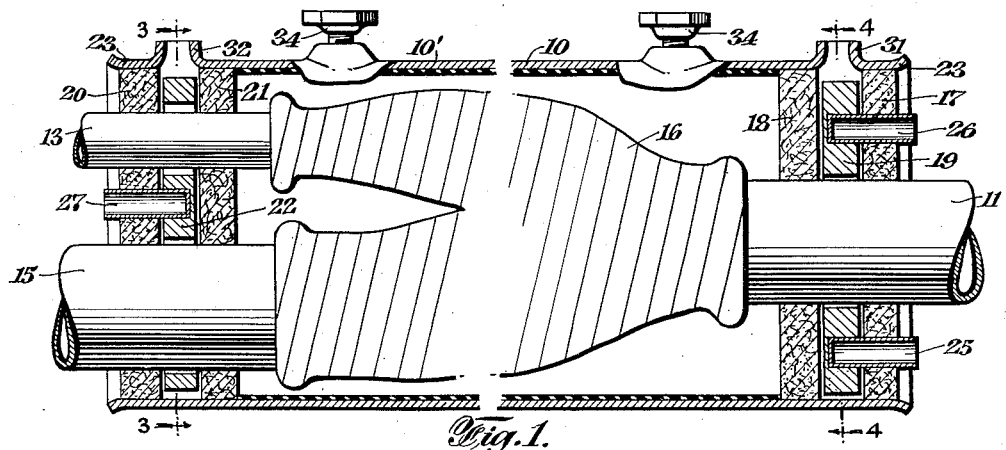

CORK OR YIELDABLE CORK
AND SYNTHETIC RUBBER
COMPOSITION

CARTRIDGE HEATER

INVENTORS
CONSTANTINE P. XENIS
ERNEST WILLIAMS
BY Ward, Crosby & Neal
ATTORNEYS

May 12, 1942.  E. WILLIAMS ET AL  2,283,023
CABLE JOINT CONSTRUCTION
Filed Feb. 15, 1941  3 Sheets-Sheet 2
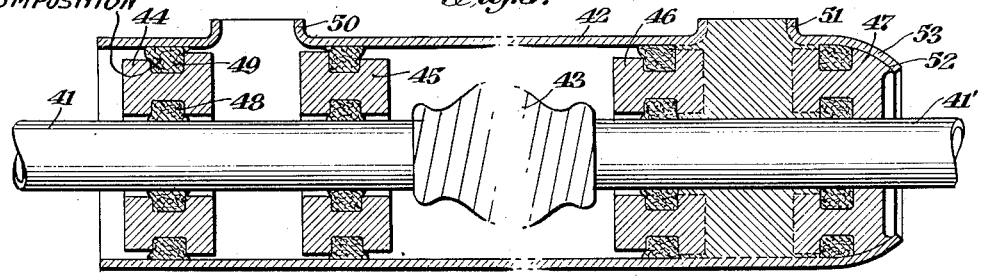
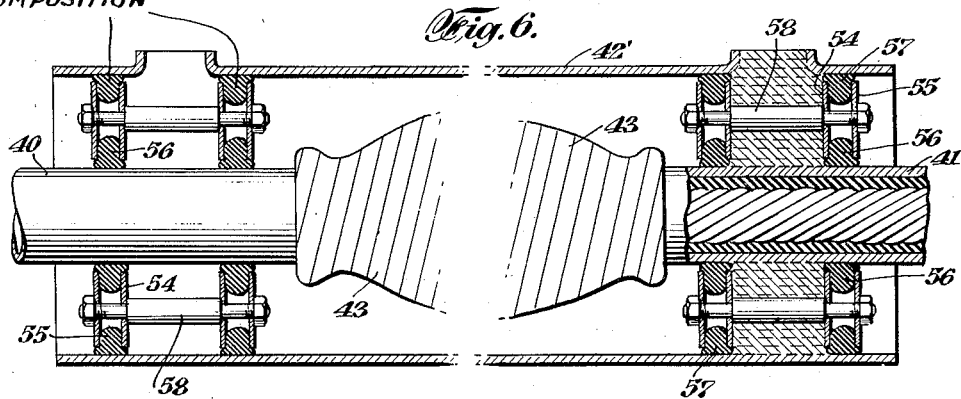
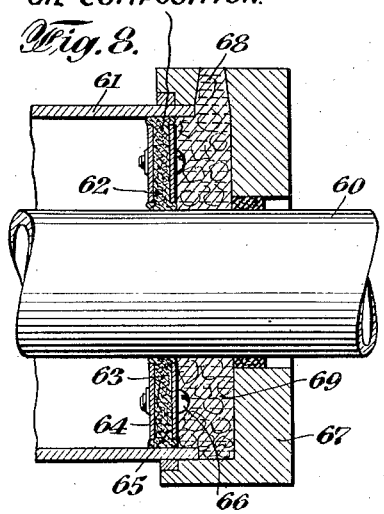
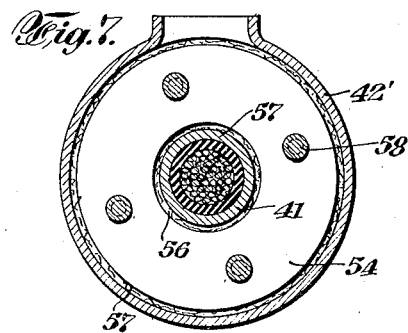
INVENTORS
CONSTANTINE P. XENIS
ERNEST WILLIAMS
BY
ATTORNEYS May 12, 1942.  E. WILLIAMS ET AL  2,283,023
CABLE JOINT CONSTRUCTION
Filed Feb. 15, 1941  3 Sheets-Sheet 3.

INVENTORS
CONSTANTINE P. XENIS.
ERNEST WILLIAMS
BY Ward, Crosby & Neal
ATTORNEYS Patented May 12, 1942

2,283,023

UNITED STATES PATENT OFFICE 2,283,023

CABLE JOINT CONSTRUCTION

Ernest Williams, Jackson Heights, and Constantine P. Xenis, Little Neck, N. Y., assignors to Consolidated Edison Company of New York, Inc., New York, N. Y., a corporation of New York Application February 15, 1941, Serial No. 379,017

5 Claims. (Cl. 174—84)

This invention relates to improved cable joints and is particularly applicable to joints for electric power cables and electrical communication wire cables of the types enclosed in lead or other metallic sheaths. This application is a continuation in part of our copending application, filed November 15, 1939 for Patent No. 2,236,862, granted April 1, 1941. Molding means for forming certain of the joints of this invention are disclosed in our copending application Serial No. 379,016, filed concurrently herewith, now Patent No. 2,259,282 dated Oct. 14, 1941, and entitled "Molding means for cable joints and the like".

Joint constructions for lead covered cables and the like are customarily covered, protected and strengthened by a lead or other metallic sleeve enclosing the spliced portions of such cables. For many years it has been the practice to effect a seal between the ends of such sleeves and the cable sheaths by "beating in" the ends of the sleeve to an extent such that the peripheral edges contact with the cable sheath, and then the region at the end of the sleeve is "wiped" by hand with solder chilled to plasticity. Such wiping operation has to be performed by skilled workmen who have gone through a considerable period of training if the occurrence of leaky or porous "wipes" is to be avoided, even with cables of relatively small size. However, with the use of cables of larger size requiring larger wipes, and particularly with complicated joints or where two or more cables enter the sleeve at one end of the joint, there is great difficulty in securing reliable wipes and only a small portion of the more skillful and experienced workmen trained in this art are able to accomplish the task, and oftentimes the operations have to be repeated again and again before successfully completed.

In performing the wiping operations, solder is melted in a pot, and then poured by the use of a hand ladle onto the area of the desired wipe. A portion of the solder thus poured adheres in plastic condition to the cable sheath or the sleeve, provided the poured solder is at the proper temperature, and the remainder is received in a wiping pad held in the hand of the operative just beneath the cable. This pouring operation is repeated again and again, while the pad with solder thereon must be skillfully wiped over the area of the desired seal until a sufficient mass of plastic solder is built up to form a poultice-like seal between the sleeve and cable sheath. The difficulties with this method arise from various causes. If the solder is too hot or if too much solder is poured onto one area, either the sleeve or cable sheath will be "burned" quickly through, that is, a hole will be melted through, ruining the joint or the cable. Also, particularly with the larger joints, if the plastic mass of solder as it accumulates on the joint, is slightly too soft, it may collapse and fall away, requiring the operative to start anew. Again, if the mass of solder solidifies before a smooth continuous wipe has been formed, crevices and irregularities will occur impairing the strength and durability of the seal or affording areas prone to leakage. While such an imperfect joint might be glazed and sometimes corrected by applying a blow torch, the use of open flames in underground manholes or passages offers a hazard from gas explosions and is therefore generally prohibited. There is a relatively narrow temperature range of plasticity required of the solder to permit sufficient workability and this necessitates skillful timing of the operations in forming the wipe. Solder with 40% tin and 60% lead as normally used for this type of work, has a plastic range of approximately 55° C., or from about 238° C. down to 183° C., the latter temperature being the solidifying point of the eutectic mixture (63% tin and 37% lead). In the wiping process as the solder is cooled to a plastic workability, there is a solidification of lead particles or crystals at temperatures above 183° C., the solidifying point of the eutectic mixture. Yet due to the fact that the eutectic mixture remains liquid down to 183° C., it tends to run out of or to the bottom of the mass being formed, leaving the wipe coarse or porous toward the top. This effect is particularly pronounced in larger wipes. For example, it has been found very difficult to secure reliable nonporous wipes on the larger cables without resorting to the hazardous glazzing process.

Further disadvantages of the customary wiping process reside in the following facts. The necessity of maintaining a pot of the molten metal at hand, particularly in confined spaces during underground work, is a dangerous hazard, as is also the ladling and pouring of such metal. The operatives are frequently seriously burned. The "beating in" of the sleeve for complicated joints requires much time, and skilled work. Often supplemental end parts must be formed and fitted, on the job, between a plurality of cables. The wiping operation for each large joint requires the services of the skilled operative for several hours even if the operations do not have to be repeated. And the quality and useful life of the resulting joint often depend largely upon chance and the skill of the workman.

While efforts have been made for years to provide some method of avoiding the above difficulties and hazards, so far as we are aware such efforts have not, prior to our inventions, produced any substitute method or construction which has gone into any substantial practical use in replacement of the manual wiping operation.

The objects of this invention include the provision of improved joint constructions which may be made by methods avoiding the above mentioned difficulties and make possible the formation of more dependable and uniformly satisfactory seals, with a substantial saving of time and without requiring the operative to have any high degree of skill or long experience. Various features of the invention are also applicable to the problem of sealing metallic sheathed cables within terminal bushings or the like, for example at points where the cables enter a transformer or other piece of electrical equipment.

Various further and more specific objects, features and advantages will clearly appear from the detailed description given below taken in connection with the accompanying drawings which form a part of this specification and illustrate merely by way of example preferred forms of the invention. The invention consists in such novel features, arrangements and combinations of parts as may be shown and described in connection with the constructions herein disclosed.

Figure 2:
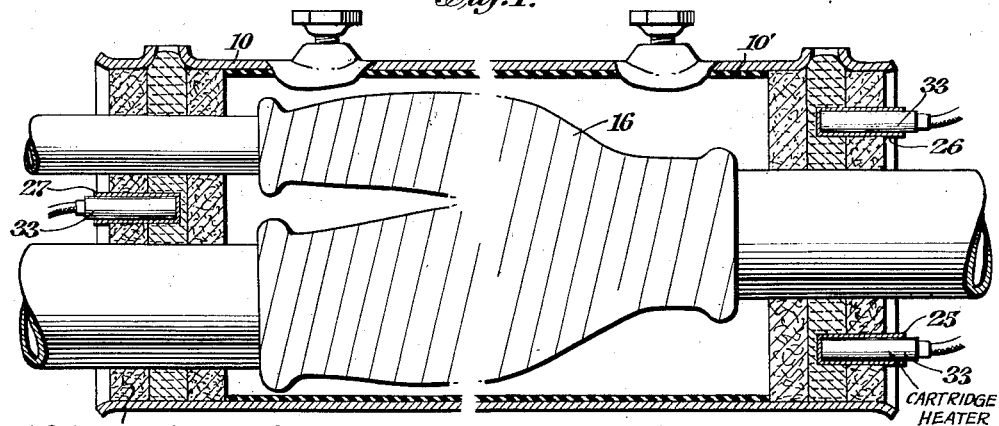
Figure 3:
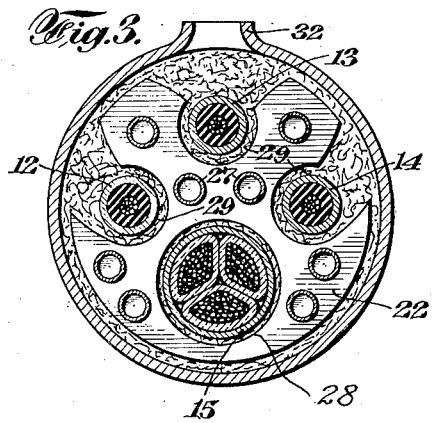
Figure 4:
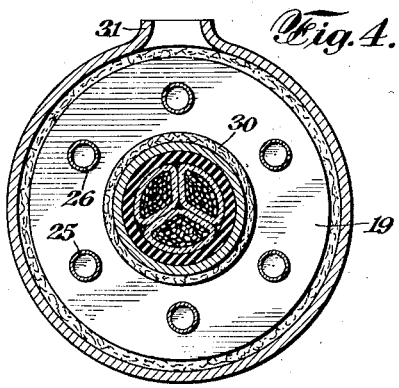
Figure 9:
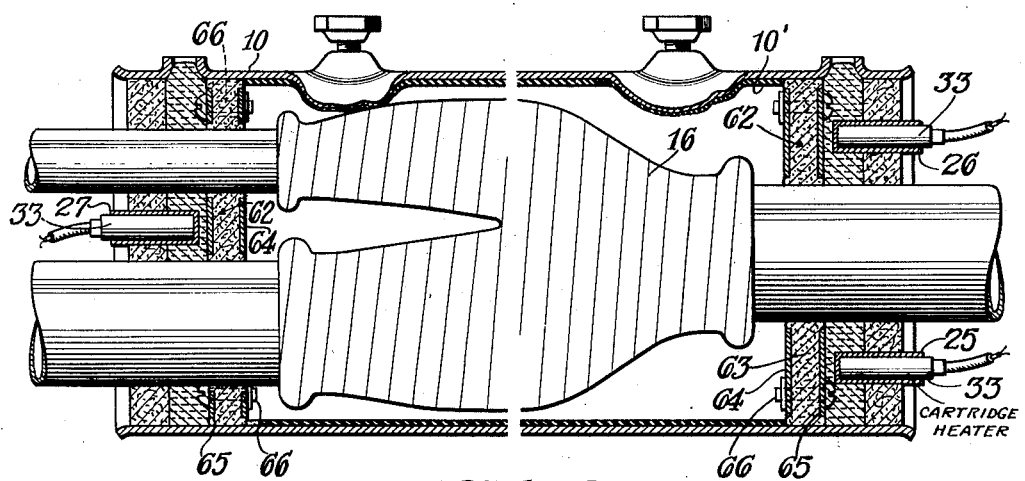

In the drawings, Fig. 1 is a vertical sectional view taken longitudinally of a cable joint, with sealing means prepared in accordance with this invention, and showing the condition of the assembled parts just prior to the final sealing operations;

Fig. 2 is a similar sectional view of a completed and sealed joint made according to the invention;

Figs. 3 and 4 respectively are transverse sectional views taken substantially along the lines 3—3 and 4—4 of Fig. 1;

Fig. 5 is a longitudinal sectional view of a modified form of the invention;

Figs. 6 and 7 respectively are longitudinal and transverse sectional views of a further modification of the invention; and Figs. 8 and 9 are sectional views of further modifications.

Referring now to Figs. 1 and 4, a joint construction is shown enclosed by a substantially cylindrical lead sleeve as at 10, the sleeve having a single lead sheathed cable, for example as at 11, extending into one end, and four lead sheathed cables as at 12 to 15 inclusive, extending into the other end. Suitable insulated electrical joints or splices may be made between the various cable ends within the sleeve as at 16 according to well-known methods. In all of the Figures 1, 2, 5 and 6 the mid portions of the joint are broken away and not shown, since these portions may be constructed in accordance with known methods.

In forming the joint, before the ends of the cable are spliced together and wrapped with insulation, the sleeve 10 may be threaded on to one of the cable ends (or on to a group of the cable ends if a plurality of cables are to enter one end of the joint), as may also a pair of barrier members as at 17 and 18 with a precast member of solder 19 interposed therebetween. The construction and use of these members will be explained further below. Also an inner sleeve of suitable rigid insulation material as at 10' may be inserted in the sleeve 10 at this time. At the other end of the joint prior to splicing the cables, similar barrier members as at 20, 21 and a precast solder member 22 are threaded on to the adjacent cable ends. It will be apparent that during the work of making the electrical connections and the insulation thereof at 16, the sleeves as well as the barrier members and precast solder members may be slid back along the cables so as to afford ready access to the region of the splice.

The inner surfaces at the ends of the sleeve are scraped clean and coated with stearin or other flux material, and the surfaces of the cable sheaths at the areas of the desired seals are similarly prepared.

After the splicing and the insulation work is completed as at 16, the sleeves 10 and 10' may be slid over the spliced region to the position shown in Figs. 1 and 2. Thereupon the barrier members 18 and 21 may be forced into the positions as shown in these figures and respectively abutting the ends of the insulation sleeve 10', so that such ends serve as stop means preventing further displacement of the barriers inwardly of the joint. Thereupon the precast solder members 19 and 22 may be slid into the positions shown in Fig. 1 and finally the outer barrier members 17 and 20 may be forced into place. The edges of the sleeve 10 at its ends are preferably slightly flared outwardly as at 23 to facilitate introduction of the barrier members into the sleeve. The lead sleeve is next tapped circumferentially on its exterior at the region of each barrier to assure a tight fit.

The barrier members 17, 18 and 20, 21 may be formed of cork or other suitable material or composition capable of withstanding the temperature of molten solder, and preferably a somewhat yieldable material which may be pressed firmly into place in the space between the cable sheath and the sleeve to prevent passage of molten solder along the surfaces of either, during formation of the seal as hereinafter described. A composition of cork and synthetic rubber known in the trade as "Corprene" has been found satisfactory. It will be understood that the peripheries of each of the barriers are cut to firmly fit within the inside walls of the particular sleeve to be used therewith, and that suitable apertures are also cut through the central areas of each barrier for permitting the desired cables to pass therethrough, the apertures being of such size that the cables will fit quite snugly therein. It is noted that the barriers also serve the function of properly supporting the cables in predetermined desired spaced positions in respect to the sleeve and each other during the sealing operations.

Also the outer barriers 17 and 20 are preferably, as shown, formed with a number of apertures for receiving thin walled tubes of copper or other heat conductive material as at 25 to 27 inclusive. As hereinafter explained in further detail, these copper tubes are adapted to receive electrical resistance heaters of the cartridge type, for heating the solder during the formation of the seal.

The precast solder members as at 19 and 22 may comprise disc-like walls or masses of solder previously cast in suitable forms or molds and of such size at their peripheries to loosely fit into the sleeve 10, and being formed with apertures or cut-out areas as at 28, 29, 30 (Figs. 3 and 4) to permit the cables to rather loosely pass therethrough. Also preferably during the casting of these solder members, the tubes as at 25, 26, 27 are so mounted in the molds that they will be retained in the solder when solidified, in the desired positions as shown in Figs. 1 to 4 inclusive. It will be noted that the inner ends of the tubes are closed to exclude the solder therefrom and are located just within the body of solder. Accordingly the solder members and the tubes for containing the cartridge heaters may be preformed as assembled units as a factory operation, thus facilitating the assembly work on the job, and the desired number and location of the tubes for proper heating is assured and may be predetermined by trial so as to insure best results, for a joint of any particular size and type.

The upper surface of the lead sleeve 10 at each end and at points just above the regions which are to be sealed, may be provided with openings as at 31, 32, surrounded by raised bosses as indicated. These openings as hereinafter explained, will enable additional solder to be introduced during the sealing operations and the raised bosses will permit the space between the barriers to be filled with solder without overflow on to the outside walls of the sleeve.

With the joint assembled as in Fig. 1, the operations for sealing the ends of the sleeve to the cable sheaths may now be undertaken. Electrical cartridge type heaters as at 33 of well-known construction may be inserted in each of the tubes as at 25, 27. A controlled amount of current may then be passed through the resistance coils of these heaters for a time sufficient to melt the cast solder members, but without danger of melting the adjacent lead cable sheaths or the sleeve. As the solder becomes molten, additional solder in the form of solid stick or wire solder, or solder pellets or solder shot may be introduced through the openings 31, 32 until the space between each pair of barriers is filled. At the same time or prior to the melting of the precast solder, suitable amounts of powdered stearin or other flux material may be introduced through the openings 31, 32. Then the heating current may be cut off or the cartridge heaters may be removed and the masses of solder between each pair of barriers will solidify, bringing the interior surface of the sleeve and the exterior surfaces of the cable sheath into an integral sealed relationship. With joints of any substantial size, the sources of heat preferably may be removed first from the lower portions of the seal, whereby these portions will solidify first. To compensate for the resulting contraction of the metal, additional quantities of stick solder or the like may be fed through the openings 31 and 32 sufficient to fill the available space remaining, after which the upper heaters may be removed or disconnected, and the upper portions of the seal allowed to solidify.

After the masses of solder have become entirely solid, the outer barrier members as at 17 and 20 may be removed if desired to permit inspection of the seals at the ends of the joints. The barrier members may be split along one or more lines if desired to facilitate both the insertion and removal thereof.

If at any subsequent time, it is desired to open the joint, cartridge heaters may be inserted again in the tubes as at 25 to 27 and sufficient heat thereby applied to readily melt down the solder seals without injury to the lead cable sheaths or the lead sleeve, whereupon the sleeves may be slid away and the splice inspected or renewed or readily replaced by a splice with additional or larger cables, for example. Then the joint may be sealed again as before. Or if a larger joint is necessary, the sleeves may be removed for reuse elsewhere and larger sleeves, barriers, etc., may be substituted.

The upper surface of the sleeve 10 may preferably be provided with a pair of apertures closed by screw plugs as at 34. These screw plugs are preferably removed during the sealing operations so as to relieve any gas pressures which might otherwise occur within the joint due to the heating of the ends thereof. And after the seals have been formed at the ends of the joint, suitable insulating liquid may be poured in through one of these openings while the other acts as an air vent.

If desired, in some cases external heating means as disclosed in our said application Serial No. 304,566 may be used instead of, or to supplement the cartridge heaters above described, and for retarding dissipation of heat from the latter.

While the particular joint shown in Figs. 1 to 4 is a so-called "one-way x four way joint," it will be understood that the invention is equally applicable to either simple joints of a single cable end to another cable end, or to joints having a plurality of sheathed cables of various different sizes and numbers coming into each end of the joint. The cables may be high or low voltage power cables with or without fluid pressures therein, or may be for telephone, telegraph or other communication purposes.

With the methods and constructions above described, it has been found that workmen, even with little experience are able to reliably seal complicated and large sized splices in a fraction of the time required for the usual wiping process. At the same time the workmen are not subjected to the hazards of working around or with open masses of molten solder. That is, all of the solder used may be in solid form at all times except when it is contained within the joint where it is to remain. There is never any necessity of incurring the hazard of using an open flame underground either to glaze the joint or for any other purpose, and there is no danger of spilling the solder on to the workmen, and there is no loss from pouring excess solder, as occurs with the wiping method.

Pressure tests made on joints completed in accordance with this invention and under practical conditions in the field, show that with both high and low voltage cable systems, reliable seals may be produced with a high degree of uniformity, dependability and certainty. The resulting construction comprising rigid disc-like members of solder effectively made integral within the ends of the sleeve, serves to greatly strengthen the joint against mechanical injury, and enable the joint to withstand the forces of repeated expansion and contraction of the heavy cables.

Since with this invention the heat may be applied by the cartridge heaters directly within the precast members of solder, these members may be quickly and uniformly heated to molten condition before there is any danger of melting or injuring by heat, the cables, cable sheaths or the lead sleeves. Since the heat is applied electrically while the solder is in place, the amount of heat may be accurately controlled, and skillful timing of the motions of the operative as necessary in pouring and wiping is obviated. The time and skilled labor required for properly "beating in" and fitting the sleeve ends and parts for wiped joints are obviated, as are also the uncertainties and defects of such method.

In practising this invention the solder composition used may be selected without adhering to the requirements of obtaining a plastic mixture over any substantial temperature range. A solder comprising 50% lead and 50% tin has been found satisfactory and the resulting cast walls of solder are substantially homogeneous throughout, and the porosity encountered in hand-formed wipes is eliminated. The solder mixture remains essentially constant as it is retained in the casting cavity.

Since a definite plastic range is not required of the solder for this method, it is possible if desired to choose a solder mixture close to the eutectic, thereby requiring less heat for melting, with less chance of injury to the cable insulation.

Another embodiment of the invention suitable for use in some cases is illustrated in Fig. 5. Here the cables or conduits to be joined are indicated at 41 and 41' and the joint structure may be enclosed in a lead sleeve 42, the same or similar if desired, to the sleeve 10 above referred to. The splice construction within the joint is indicated at 43. In this case the barrier members as at 44 to 47 inclusive may comprise annular members of lead or other suitable metal, and each having internal and external annular recesses for receiving gaskets as at 48 and 49. These gaskets may comprise annular rings of rubber or a composition for example of artificial rubber and cork or other suitable material, preferably somewhat yieldable and capable when inserted under pressure as shown, of preventing passage of the molten solder from the cavity formed between each pair of barriers. After the barriers are in place as indicated in Fig. 5, the cavity between each pair may be filled with molten solder poured through openings as at 50 and 51, or preferably the cavities may be filled with solder pellets and then heated to molten condition as by the use of external heating means such as above referred to. In either case parts which are intended to adhere to the solder are cleaned and treated with flux in a manner similar to that above described. As the solder is allowed to solidify, additional solder in solid or molten condition may be introduced through the openings 50 and 51 to compensate for the contraction of the cooling metal and so that the cavities upon completion will be filled. In Fig. 5 the lefthand end of the joint is shown prior to the introduction of the solder and the righthand end of the figure provides a cross sectional view of the seal after completion. In case the barriers as at 46, 47 are made of lead or other metal to which solder will adhere, the resulting seal at the end of the joint will in effect take the form of an integral mass, including the end of the sleeve, the barriers and the cable sheath. If desired, the outer portions of the outer barriers may be rounded as at 52 and after the barriers are in place, the ends of the sleeve may be beaten in to a correspondingly rounded degree as indicated at 53.

Another form of barrier means which may be used according to the invention is illustrated in Figs. 6 and 7. The joint here shown may be generally similar to that of Fig. 5, except that each barrier may comprise a pair of annular metallic washer-like members as at 54 and 55, with internal and external gaskets as at 56 and 57 clamped therebetween, each pair of barriers being secured together as by a plurality of threaded rods as at 58. If desired each pair of the gaskets 56, 57 may be of one integral disc-like piece suitably apertured, as apparent, for the rods 58. The manner of using this construction will be apparent from the above descriptions. It will be understood that the greater part of the solder of the embodiments of Figs. 5 to 7 inclusive if desired, may also be introduced in the form of precast solder walls similar to the precast solder members in Fig. 1. In fact, if desired, a precast solder member with the barriers as of Fig. 6 may be introduced as an assembled unit. If desired, with the arrangement of Fig. 6 the innermost gaskets 56 and 57 with the metallic clamping members therefor loosely engaging same, may be first introduced together with the rods 58 before the outermost gaskets and clamping members are applied to the rods. This will leave the outer ends of the rods free for access so that the same may be turned to cause the inner metallic washers to tightly clamp the inner gaskets, thus expanding the gaskets into firm sealing relationship with the sleeve as shown. The inner nuts on the rods 58 may be soldered, welded or otherwise affixed to the inner clamping members so that the nuts will not turn during this operation. After the inner gaskets are thus clamped in place, the outermost gaskets 57 and the clamping means therefor may be readily applied and then clamped in position by the outer nuts on the rods 58. The members 55 and rods 58 are preferably made or plated with a suitable metal to which the solder will firmly adhere in sealing relationship to form in effect an integrally sealed end piece for the joint.

In the embodiment of the invention shown in Fig. 8, a lead cable sheath is shown at 60 and a lead sleeve at 61 for enclosing a cable joint or terminal connection. In this form the barrier 62 may be formed of a wall-like mass of somewhat resilient cementing or sealing material as at 63 clamped between a pair of annular sheet metal or other suitable rigid plates as at 64, 65 held firmly together as by a plurality of screws or bolts as at 66. The material 63 may preferably comprise a mass of asbestos fiber saturated with oil of the same or similar character to the oil used in the oil-filled cable 60. The fibrous material may also comprise mineral wool or fine spun glass or the like. The term "mineral fiber" as used in the claims is intended to have reference to such materials as well as asbestos fiber. It is highly advantageous to use such mineral fibers for this purpose as the same will be free from attack over long periods of time by the oil used to fill the joint or the cable. Also, since such materials will not be attacked by the oil, they will not tend to cause the composition of the oil filling in the joint to be altered even after the joint has been in long use. The mixing of this fibrous material with oil of the same general character as used in the cable or the joint, will afford the material a cement-like character so that under the pressure of the clamping members it will expand at its edges into firm sealing relationship with the inner walls of the sleeve as well as the outer surface of the cable sheath. The use of oil of the same character as in the joint or in the cable, of course also avoids any danger of deterioration of the oil in the joint due to the character of the oil in the barrier as well as further avoiding injury to the oil in the barrier by the oil in the joint.

With the form of the invention shown in Fig. 8 if desired, the cable or cable sheaths and the end of the sleeve 61 may be suitably embraced by removable molding means as at 67, for example, of a type such as disclosed in our copending application, filed November 15, 1939, for Patent No. 2,236,863, granted April 1, 1941. With this mold in place, the solder may be introduced as through a sprue 68, in the form of solder pellets. These pellets may be melted within the mold either by suitable heating means within or applied to the mold 67 so as to form a solid disc-like mass as at 69 sealing the end of the sleeve 61 with respect to the cable sheath 60. After the mold is cooled and the mass 69 hardened, the mold 67 may be removed.

Cementing or sealing material such as at 63 as above described may also be used if desired in place of the gaskets and the like, as shown at 48, 49, 56, 57 in Figs. 5 to 7. It will be apparent also that various features of the embodiment of Fig. 8 may be substituted in the form of joint shown in Figs. 1 to 4, that is, as shown in Fig. 9 the barrier assembly of Fig. 8 may be used in a joint otherwise like that of Fig. 2.

While the invention has been described in detail with respect to particular preferred examples, it will be understood by those skilled in the art after understanding the invention that various changes and modifications may be made without departing from the spirit and scope of the invention, and it is intended therefore in the appended claims to cover all such changes and modifications.

What is claimed as new and desired to be secured by Letters Patent is:

1. An electric cable joint construction comprising a lead sleeve, a lead sheathed cable extending into an end thereof, the interior walls of the sleeve being spaced substantially from the sheath, and a wall of solder within the sleeve adjacent the end thereof, and integrally sealing the exterior surface of the cable sheath in respect to the interior surface of the metallic sleeve, said wall of solder having a melting temperature below that of the sleeve and sheath and being formed with a plurality of heating element cavities at spaced points around the cable and open to the exterior of the joint construction, whereby heating elements may be inserted in said cavities to melt said wall for opening the joint.

2. An electric cable joint construction comprising a metallic sleeve, a metal sheathed cable extending into an end thereof, a body of solder adjacent the end of the sleeve and integrally sealing the cable sheath in respect to the metallic sleeve, and a plurality of cartridge-like members for receiving heating elements cast in said body of solder.

3. Barrier means adapted to close off a cable joint construction against escape of solder during sealing of the joint, comprising a disc-like member of resilient material capable of withstanding the melting temperatures of solder, one or more apertures therethrough for the cable or cables and also apertures containing cartridge-like members for receiving heating units to melt the solder.

4. An electric cable joint construction comprising a metallic sleeve for enclosing the joint, a metal sheathed and oil-filled cable extending into an end thereof, the interior walls of the sleeve being spaced substantially from the sheath, barrier means embracing the cable at a point within the sleeve and spaced from the end thereof, the periphery of such barrier means pressing against the interior walls of the sleeve, said means including a mass of mineral fiber embodying oil of the same general character as the oil in the cable, and a wall of solder encircling the cable sheath at the outer face of said barrier means and within the end of the sleeve and integrally sealing the exterior surface of the cable sheath in respect to the interior surface of the metallic sleeve.

5. An electric cable joint construction comprising a metallic sleeve for enclosing the joint, a metal sheathed and oil-filled cable extending into an end thereof, barrier means embracing the cable at a point within the sleeve adjacent an end thereof, said means including a mass of mineral fiber embodying oil of the same general character as the oil in the cable, clamping means engaging opposite faces of said mass and causing its edges to protrude under pressure against the inner walls of the sleeve and against the cable sheath, and a wall of solder encircling the cable sheath at the outer face of said barrier means within the sleeve and integrally sealing the exterior surface of the sheath in respect to the interior surface of the sleeve.

ERNEST WILLIAMS.
CONSTANTINE P. XENIS.